United States Patent [19]
Dichter

[11] Patent Number: 5,896,443
[45] Date of Patent: Apr. 20, 1999

[54] PHONE LINE COMPUTER NETWORKING

[75] Inventor: Carl Dichter, Chandler, Ariz.

[73] Assignee: Intel Corporation, Santa Clara, Calif.

[21] Appl. No.: 08/781,265

[22] Filed: Jan. 10, 1997

[51] Int. Cl.[6] .................................................. H04M 11/00
[52] U.S. Cl. ...................... 379/93.08; 379/90.01; 370/445
[58] Field of Search ............... 379/90.01, 93.01–93.09, 379/93.14, 93.21, 93.28, 93.37, 110.01, 156–173, 387, FOR 115, FOR 116, FOR 112; 370/445, 450, 481, 488–497; 375/288; H04N 7/14

[56] References Cited

U.S. PATENT DOCUMENTS

| | | | |
|---|---|---|---|
| 4,596,011 | 6/1986 | Kobayashi et al. | 370/445 |
| 4,785,448 | 11/1988 | Reichert et al. | 379/93.14 |

FOREIGN PATENT DOCUMENTS

| | | | |
|---|---|---|---|
| WO93/11637 | 6/1993 | WIPO | H04N 7/14 |
| WO96/29808 | 9/1996 | WIPO | |

*Primary Examiner*—Wing F. Chan
*Attorney, Agent, or Firm*—Blakely, Sokoloff, Taylor & Zafman LLP

[57] ABSTRACT

The invention provides for simultaneous local area networking and analog telephony using a single telephone line. The local area networking is carried out using two or more high-frequency modems, which when coupled to devices, can transfer data on high-frequency signals. These high-frequency signals may be carried on the telephone line along with the lower frequency signals used for analog telephony provided there is proper isolation. Thus, the invention utilizes selectively high-frequency bandpass and audio frequency bandpass filters coupled to the telephone line.

12 Claims, 5 Drawing Sheets

PHONE LINE COMPUTER NETWORKING

BACKGROUND OF THE INVENTION

1. Field of the Invention

The present invention relates to the field of communications systems. More specifically, the present invention relates to the networking of devices using phone lines.

2. Description of Related Art

The telephone lines that connect together and are wired into residences and businesses as a part of the telecommunications infrastructure (POTS—Plain Old Telephone System, PSTN—Public Switched Telephone Network) often come in one or more pairs, each pair consisting of two wires. Although most establishments have four wires, only two of those wires, known as "tip" and "ring" (collectively, "analog pair"), are utilized for voice and data communication. Voice and data communication carried over tip and ring utilize very low frequencies, typically below 3 KHz. When data is carried over the analog pair, a modem, which is typically a low-frequency device, is connected to a device such that the modem can convert binary information into low-frequency analog signals that can be transmitted over the analog pair.

On a single analog pair, currently there is no practice for simultaneously utilizing that pair for both voice (audio) and local area network (LAN) data communication, i.e., a person talking on the telephone line with a standard POTS telephone while a modem or other data device transmits information to other nodes (i.e., other modems) utilizing the same analog pair. The same pair cannot be used simultaneously for both voice and data on a traditional telephone line because the low-frequency signals which carry information originating from the modem or device would conflict and interfere with the voice and audio signals which travel over those same lines and at those same frequencies.

There is currently practice for utilizing the unused pairs in an establishment for performing networking or other data communication while analog pairs are being used for voice. The unused pairs do not substantially interfere with the voice communications ongoing on the active telephone line since the two lines are physically separate. However, this practice requires that the residence or other establishment have at least two pairs-one that is used for analog telephony, and one or more pairs dedicated to data communications. Some residences are only equipped with two pairs, one of which is required for voice telecommunications. In many instances, it is too cost prohibitive to install additional pairs that are devoted solely to data communications and networking. For example, to undertake 10 BaseT, CEBus™ (Consumer Electronics Bus, a trademark of the Electronics Industry Association), or Localtalk (a trademark of Apple Computer Corporation) communications, at least two additional pairs, which are quite expensive, are required. In those establishments which do have an additional pair, that pair is often used as a second phone line.

Another use of the existing analog pair for networking is ADSL (Asymmetric Digital Subscriber Line), which uses high frequencies to communicate across the PSTN (i.e. to dial outside the local area) for connecting, for example, to the Internet. ADSL however, cannot be used for local area networking on one analog pair since it is point-to-point (i.e. requiring a central master which is located distant from the local loop). ADSL requires significant changes to POTS wiring and the PSTN infrastructure. Since ADSL attempts to transmit high frequency signals over a long distance, a large amount of power is required to overcome parasitic losses. For local area networking, therefore, ADSL is not impractical, but inapplicable.

Thus, there is needed a practice for utilizing a single analog pair to carry out both voice communications and local area networking simultaneously without the signals interfering with or interrupting each other.

SUMMARY

The invention provides a method and apparatus for enabling an active analog pair (telephone line), used for voice and data communications, to simultaneously carry out local area networking. According to one embodiment, an active analog telephone line, which may already be coupled to a series of telephones within an establishment (local loop), is connected to a frequency isolation system and to a number of high-frequency modems. The frequency isolation system consists of high frequency bandpass filters and audio frequency bandpass filters which serve to isolate devices connected to the telephone line so that only high-frequency signals travel between the high-frequency modems, and only low-frequency signals travel between the voice telephone equipment and PSTN. Depending on parameters such as the distance in the telephone line from one end to another or from node to node and the antiquity of the telephone devices and of the telephone wiring system, the frequency isolation system will vary in its configuration. The high-frequency modems connect together two or more devices for local area networking on the same telephone line. These high-frequency modems differ from ordinary standard computer modems in that they are capable of transmitting and receiving data using a high-frequency typically above 100 Kilohertz (KHz) and below 200 KHz. Standard low-frequency modems can also be connected to the line for dialing outside of the local area network. Audio frequency bandpass filters are coupled to older-style telephonic devices as well, so that when the high-frequency modems send and receive high-frequency signals, they do so without interfering or interrupting the low-frequency signals of an active analog audio telephone line communication session. Further, to prevent high-frequency signals from radiating outside to the PSTN, audio frequency bandpass filters are provided at a junction box in the establishment.

DETAILED DESCRIPTION OF THE INVENTION

Figure 1:
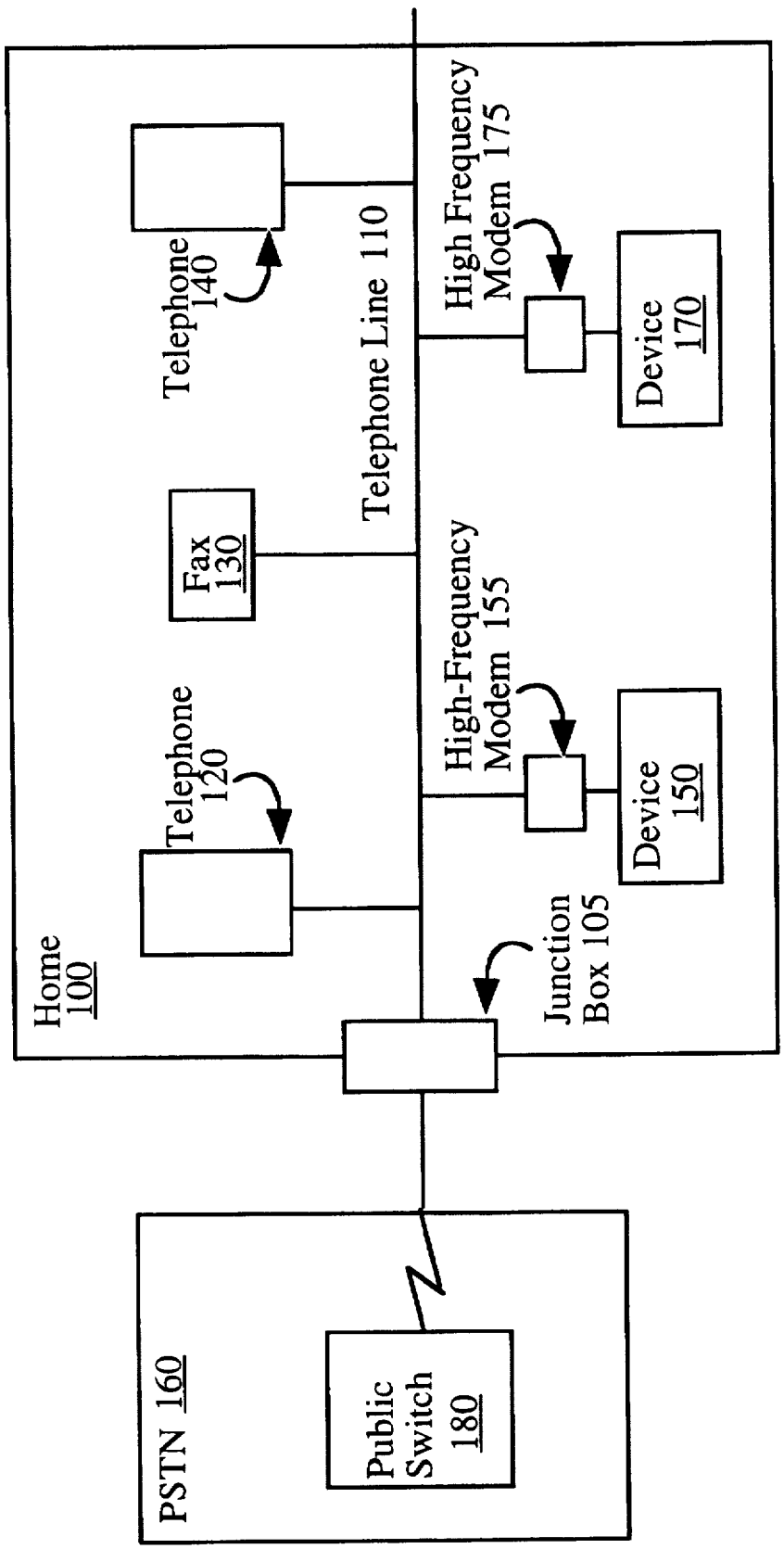
FIG. 1 shows a residence or other establishment wired with telephone line local area networking according to one embodiment of the invention.

FIG. 1 shows a residence or other establishment wired with telephone line local area networking according to one embodiment of the invention.

FIG. 1 illustrates a typical residence or other establishment which has only one telephone line and a variety of telephone devices and devices connected to it. The invention utilizes high frequency modems as well as a frequency isolation system to accommodate a simultaneous local area networking capability with the analog audio communication.

FIG. 1 shows a home 100 wired with a telephone 120, a facsimile machine (or fax) 130, a telephone 140, a device 150 and a device 170 all connected to an existing analog pair (hereinafter "telephone line") which connects out to a public switched telephone network (PSTN) 160 terminating in a public switch 180 making analog telephony operable from one telephone line to another. A junction box 105 is used to separate the home from the PSTN and is used as a testing facility for trouble shooting as well as to wire new telephony outlets in their home 100. The telephone 120 may be a typical telephone device which is capable of sending and receiving audio signals through a microphone and speaker, respectively, such as that supplied by telephone companies for use in ordinary telephones. Telephones primarily send and receive audio signals which are low-frequency, typically under 3 KHz.

Low-frequency signals are utilized in telephones because high-frequency signals tend to attenuate due to the parasitics and capacitance of the lines over which the analog telephone signals must travel. For instance, the distance from home 100 to the public switch 180 may reach several miles or more. However, for local area networking, for example, the distance high-frequency signals must travel, and thus their attenuation, is much less. Therefore, high frequency signals, if used for local area networking, would not attenuate enough to impair the functionality of the signals as data. On a copper-wire medium such as a telephone line, high-frequency signal attenuation is a well-known characteristic to one of ordinary skill in the art, and thus, will not be discussed in detail. Telephone 140 may be the same as telephone 120 or may be an older style telephone which can attenuate high frequency signals due to capacitance or resistive characteristics not found in newer, more modern telephones. If telephone 140 is such an older style phone, an inductive element such as an audio frequency band pass filter, would be required to ensure that no attenuation occurs (see FIG. 5). Further, there may be a facsimile machine (or fax) 130 which is also connected to the telephone line 110, which uses the telephone line to dial out and transmit data information which constitutes a facsimile message rather than audio. The facsimile machine operates in much the same manner in terms of frequency utilization and sensitivity as do ordinary telephones, and, therefore, for the purpose of describing the invention, facsimile machines are virtually identical to ordinary telephones.

The devices 150 and 170 may range from a desktop personal computer to a personal digital assistant or other device which can receive, process and output data. Devices 150 and 170 may also be devices of less intelligence than data processing devices such as a thermostat or printer which may send/receive signals such as control signals. Device 150 has coupled to it a high-frequency modem 155 which allows the device 150 to communicate the data that it is outputting or receiving on a high-frequency signal carried across telephone line 110. Similarly, device 170 has a high-frequency modem 175 coupled to it for allowing the device 170 to transmit and receive data on high-frequency signals over telephone line 110. Though the telephone line 110 is ordinarily used to dial out, i.e., dial outside of the home 100 (local loop) through the PSTN 160, high-frequency modems 155 and 175 allow device 150 to communicate with device 170 as a local area network (LAN) without dialing out.

In traditional LAN environments, a single communication medium, such as Ethernet, has been utilized to carry information from one device to another device or devices. In this embodiment, telephone line 110 eliminates the need for Ethernet (or other LAN communication medium) and allows devices 150 and 170 to be networked to each other. Devices 150 and 170, once networked, have the ability to share applications, share files, and directly communicate to enable, for example, videoconferencing. Devices 150 and 170 can send and receive packets of data in TCP (Transmission Control Protocol), IPX, NetBuei or any networking protocol. Devices 150 and 170 may also operate as client-server where device 150 acts as a server serving applications and files to device 170. Typically, devices 150 and 170 will operate as a peer-to-peer network where devices 150 and 170 have no client to server relationship. In either case, in one embodiment, one of the devices networked must perform "bus mastering" which is required to identify, control and arbitrate data and control packets which are transferred over telephone line 110 by devices 150 and 170. Bus mastering determines the source, destination and purpose for a signal, and to complete transactions based on certain signaling priorities between devices 150 and 170. If the packet concept is used in communicating data, parsing header fields for the packet may be one means of performing bus mastering.

In the preferred embodiment, there is no bus mastering, but merely collision detection and avoidance as in Ethernet-based local area networks operating from a central hub. With collision detection, the main consideration is whether or not other packets of data are being currently sent. Sensing for collision detection and such are well-known in the art and may be readily modified for use with the invention.

High-frequency modems 155 and 175 may be disposed within the devices 150 and 170 or may be disposed outside of the devices and connected externally to the devices 150 and 170 and to telephone line 110. Using the invention, a caller on telephone 120 can dial out over telephone line 110 to the public switch 180 to another telephone line in another establishment, and simultaneously use high-frequency modem 155 and high-frequency modem 175 to send high-frequency signals between each other to carry out the task of local area networking within the local loop. Thus, on a single telephone line, both analog telephony and local area networking can simultaneously operate.

However, a high-frequency modem sending and receiving high-frequency signals on an analog telephone line undergoes a fundamental problem in some environments. Some older phone equipment may appear as a "short" (low impedance) to high frequency signals thereby attenuating their amplitude and distorting data accuracy. Therefore, an audio frequency bandpass filter is used in conjunction with such older-style telephone equipment to isolate the equipment from these high frequency signals (see FIG. 5).

Figure 5:
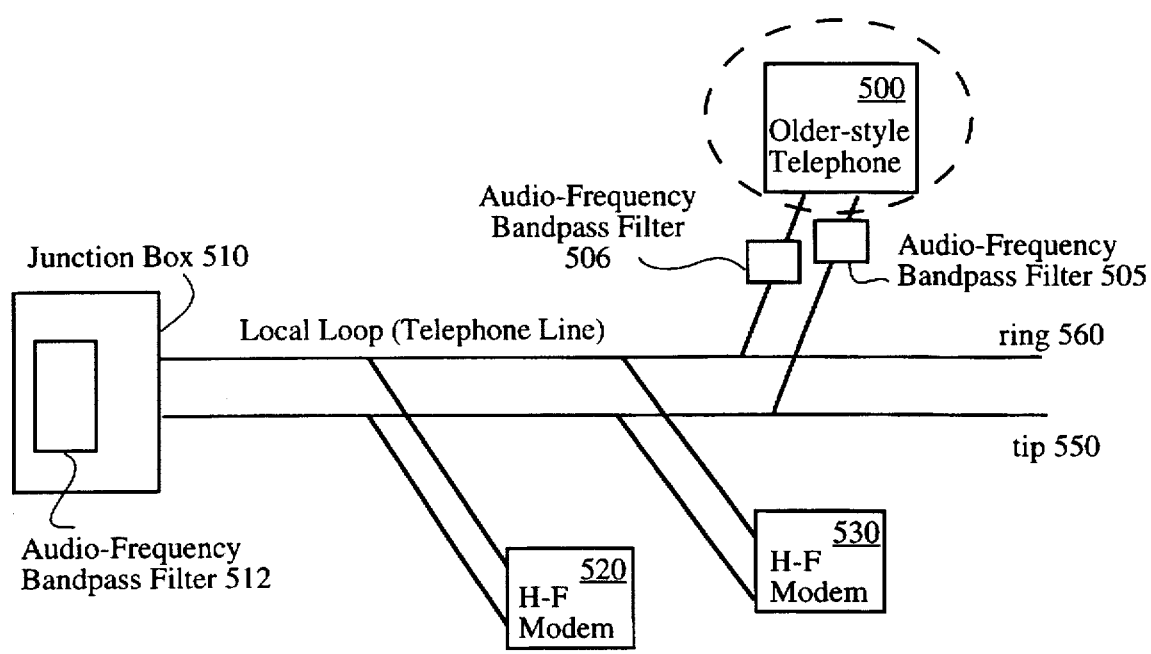
FIG. 5 illustrates the components of one embodiment of the invention.

A second problem encountered with high frequency networking is to assure that DC and low frequency characteristics required by the local loop are not affected for analog telephony. To meet this assurance, a high-pass filter may be employed within the high frequency modem so that it is effectively isolated from low frequencies. Also, FCC (Federal Communications Commission) regulations dictate that high frequency signals must not be radiated onto the PSTN. Therefore, FIG. 5 shows an audio frequency band pass filter within junction box 105 to prevent the high frequency signals used for radiating outside the local loop.

Figure 2:
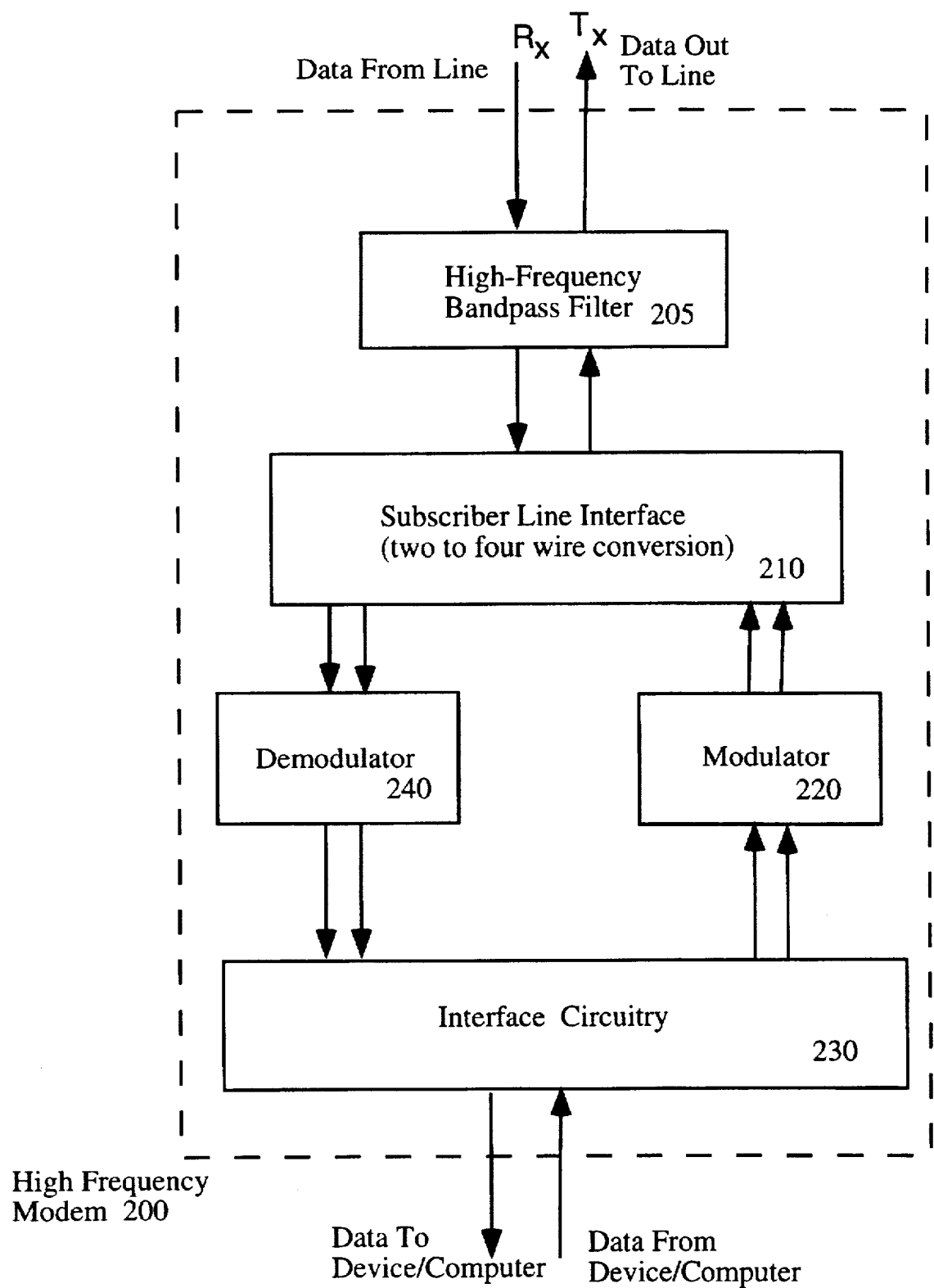
FIG. 2 illustrates the components of a high-frequency modem employed in the various embodiments of the invention.

FIG. 2 illustrates the components of a high-frequency modem employed in the various embodiments of the invention.

The high-frequency modem 200 shown in FIG. 2, consists functionally of five components and is an integral part of the frequency isolation system. Received signals Rx and transmitted signals $T_x$ pass through a high-frequency bandpass filter. A signal $R_x$ may contain both audio frequency signals used for telephony (under 3 KHz) and high frequency (100 KHz to 200 KHz) signals used for local area networking. The filter 205 is configured to pass only signals in the frequency band of interest to the high-frequency modem 200 (between 100 KHz and 200 KHz) and reject other frequencies. The design of such filters is well known in the art and will not be described further. While filter 205 is shown as a single four port unit, it may be two two-ported filters, one for Rx and another for $T_x$. Though a filter may not be required for transmitted signals $T_x$, it has no harmful effect and may make the design simpler (i.e. providing the same transfer function both transmit and receive). A subscriber line interface 210 coupled to filter 205 makes a two wire to four wire conversion which is necessary to convert the two wire local loop into send and receive pairs employed by the high frequency modem. When a signal $R_x$ shown in FIG. 2 is passed through filter 205 and then received by the subscriber line interface 210, the signal is demodulated by demodulator 240 which is capable of transforming, for example, a frequency shift keying (FSK) encoded signal v(t), back into binary data, represented by d(t). In FSK, a d(t) of +1 volts may be modulated on a carrier frequency wH which is a nominal carrier frequency w plus some constant offset $\Omega$. Likewise, a d(t) of −1 volts may be modulated on a carrier frequency of $w_L$ which is the nominal carrier frequency w minus the same offset $\Omega$. The signal of carrier $w_H$ is of positive amplitude when d(t)=+1 and 0 when d(t)=−1. Likewise, the signal of carrier $w_L$ has an amplitude of 0 when d(t)=+1 and 1 when d(t)=−1. Thus, at any one time, the total transmitted v(t), which is the sum of the $w_L$ and $w_H$ modulated signals, is at angular frequency $w_L$ or $w_H$ but not both. Modems may be configured typically as half-duplex, but can be adapted to full-duplex mode. High-frequency local area networking may be full-duplex by the use of bandsplitting or echo cancellation.

Taking the FSK example with bandsplitting, the carrier frequency may be defined differently for transmitted signals $T_n$ and received signals $R_n$. Transmitted signals $T_n$ would be carried at a frequency $w_1$, and received signals carried at $w_2$ such that, using bandsplitting, $w_1 \pm \Omega_1 \neq w_2 \pm \Omega_2$, where $\Omega_1$ and $\Omega_2$ are constant, offsets the transmitted and received signals, respectively. The interval between $w_1$ and $w_2$ must be large enough such that even when error is present, the high-frequency modems are still capable of accurate signal detection.

Echo cancellation can also be employed to achieve full-duplex networking. A machine X will through its high-frequency modem transmit signals $T_x$ and receive signals $R_x$. Another machine Y will transmit signals $T_y$ and receive signals $R_y$ and is local area networked to X such that $R_y=T_x$ and $R_x=T_y$. With echo cancellation, the same frequency range is used for both machines X and Y. In full duplex mode, both X and Y are capable of simultaneous transmit and receive. To discriminate the content of a received signal, each machine subtracts the signal it transmits from the received to account for the transmitted echo. If machine Y transmits a signal $T_y$ to X, machine X will apply echo cancellation to its received signal Rx such that $R_x-T_x=T_y$. The received signal Rx, due to signal echo, is a combination of any transmitted signal $T_x$ from X, and the signal $T_y$ transmitted from Y. Likewise, if machine x transmits a signal $T_x$ to machine Y, machine Y will apply echo cancellation such that $R_y-T_y=T_x$.

The demodulator, a well-known communication circuit, serves to convert an analog signal into a digital signal which is capable of being understood by a computer or other device. Interface circuitry 230 provides the specific communication protocol capability which the device to which the modem is connected requires. For instance, if the device to which the high-frequency modem is connected utilizes the RS232 serial interface standard, then level converters within the interface circuitry 230 would transform data to be compatible with an RS232C standard. RS232 specifies the connector type, pin assignments, as well as the properties of both drivers and receivers. With level conversion, analog data at certain frequencies are transformed into a "mark" which indicates a low logic level ("0") while certain other analog frequency signals would be transformed into a "space" or a high logic level ("1").

RS232 is provided merely as an example, and one skilled in the art will be able to readily adapt the invention for any manner of serial or parallel data interfacing protocol that the device requires or prefers. This may include modem cards (internal modems) which interface through a slot directly to a bus of the device. Additionally, for instance, if the modem needed to be connected through a parallel port of the device, the interface circuitry 230 would include a serial interface adapter to serialize the data.

A signal $R_x$, when received from the device by the interface circuitry 230, first passes to modulator 220, which transforms binary data into high-frequency analog signals which can then be transmitted through the subscriber line interface and over the telephone line. FSK modem technology for low frequencies is modified for this embodiment to operate in frequencies well above typical audio frequencies. A low-frequency modem would have modulators and demodulators which utilize FSK over the audio bandwidth of 60 Hertz to 3 KHz. Though simple FSK technology only provides for a throughput of about 1 bit per Hertz, since we are operating at frequencies of 100 KHz or more, there is sufficient bandwidth to perform most types of networking.

Figure 3:
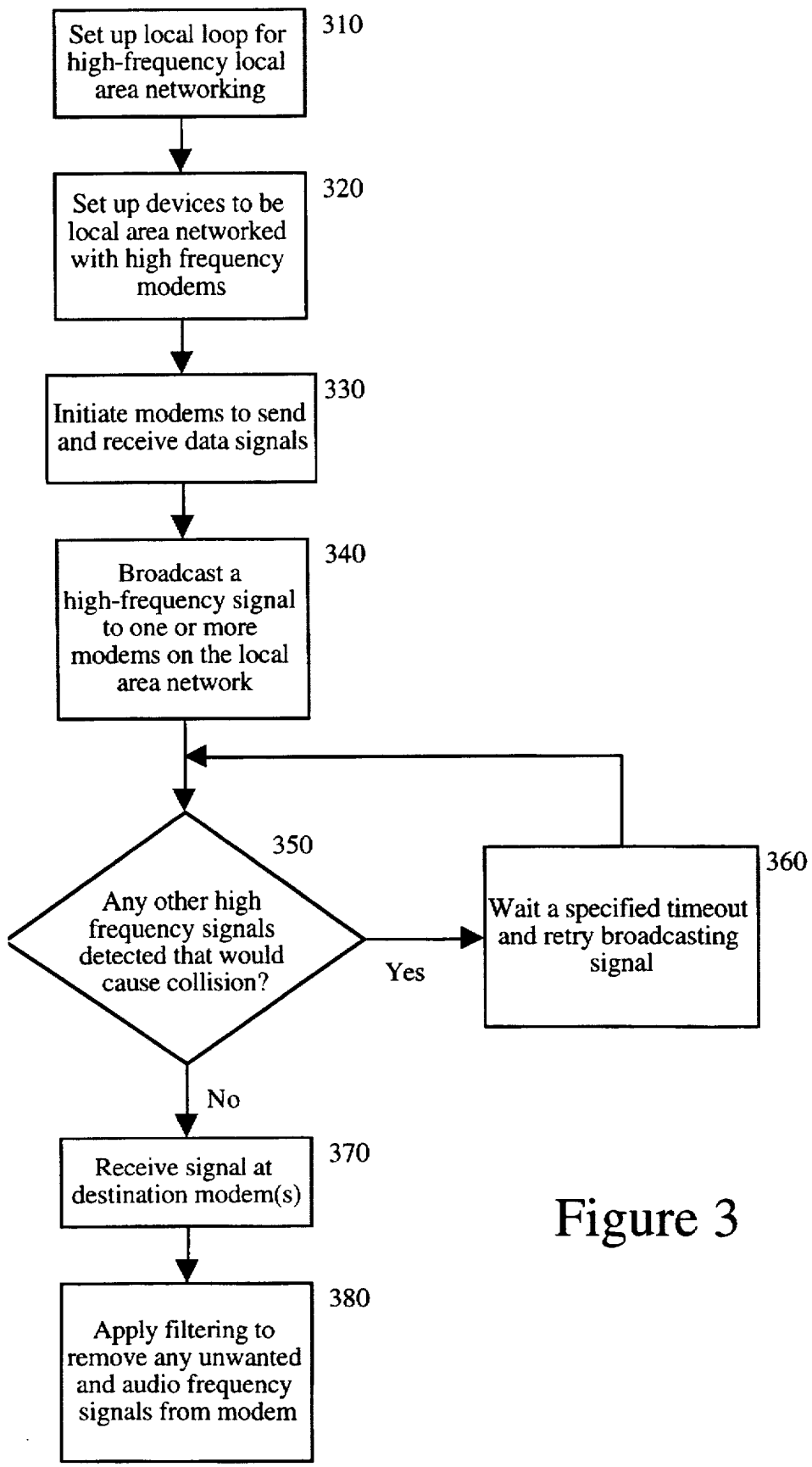
FIG. 3 is a flowchart of the methodology of local area networking on an analog telephone line.

FIG. 3 is a flowchart of the methodology of local area networking on an analog telephone line.

The first step of the invention is to set up the local loop for high-frequency local area networking (step 310). This involves installing audio frequency bandpass filters at the junction box and to the terminals of any older-style telephone equipment where a danger of attenuation is present. Setting up the local loop also requires that high-frequency modems (integrated with high-frequency bandpass filters) be connected to the telephone line and to the devices which they service (step 320). Also, according to step 320, the devices which are serviced by the high-frequency modems must be powered on and have an operating system and/or network protocol stack which permits transmission and reception of data packets installed and memory resident. For instance, running Windows NT™ (a product of Microsoft Corporation) provides native network drivers and a peer-to-peer network management system identifying users/groups, specifying permissions and performing all administrative functions necessary for local area networking.

The next step is to initiate modems to send and receive data signals on the local area network (step 330). This involves powering the modems and sending handshaking signals across the local loop to test their connectivity with other modems on the network. According to step 340, a high-frequency signal may then be broadcast to one or more modems on the LAN. The broadcasting of the data/control signal allows one or more other devices to receive data from the broadcasting modem. Each of the high-frequency modems have this broadcast capability in a peer-to-peer embodiment.

Once the signal is broadcast across the telephone line, a signal tester, similar to those found in Ethernet hubs, will check if any other high-frequency signals are detected which would cause a collision (step 350). If so, then the modem is commanded to wait a specified timeout period and then retry broadcasting of the signal (step 360). When the signal can be broadcast without collision, the signal is received at the modem or modems for which it was targeted (step 370). The techniques and protocols for identifying machines on a LAN are well-known in the art and may be adapted to fit the network.

When the signal is received at a modem, it may be frequency multiplexed with other signals such as those used in analog telephony and destined to be delivered outside the local loop to the PSTN. To accommodate the simultaneous operation of analog telephony with local area networking, analog telephone signals in their audio frequency band (up to 3 KHz) must be transmitted together. As a result, the modem, upon receiving the signal, must apply filtering to remove unwanted signals such as noise and audio frequency band signals so that only high-frequency signals related to local area networking remain for the modem to translate (step 380). Steps 340 through 380 are repeated at each instance of a transmitted/broadcasted data signal, while the set-up and initialization steps 310 through 330 are likely to be performed less often, and only in the case of physical infrastructure changes in the LAN such as adding of a new machine.

Figure 4:
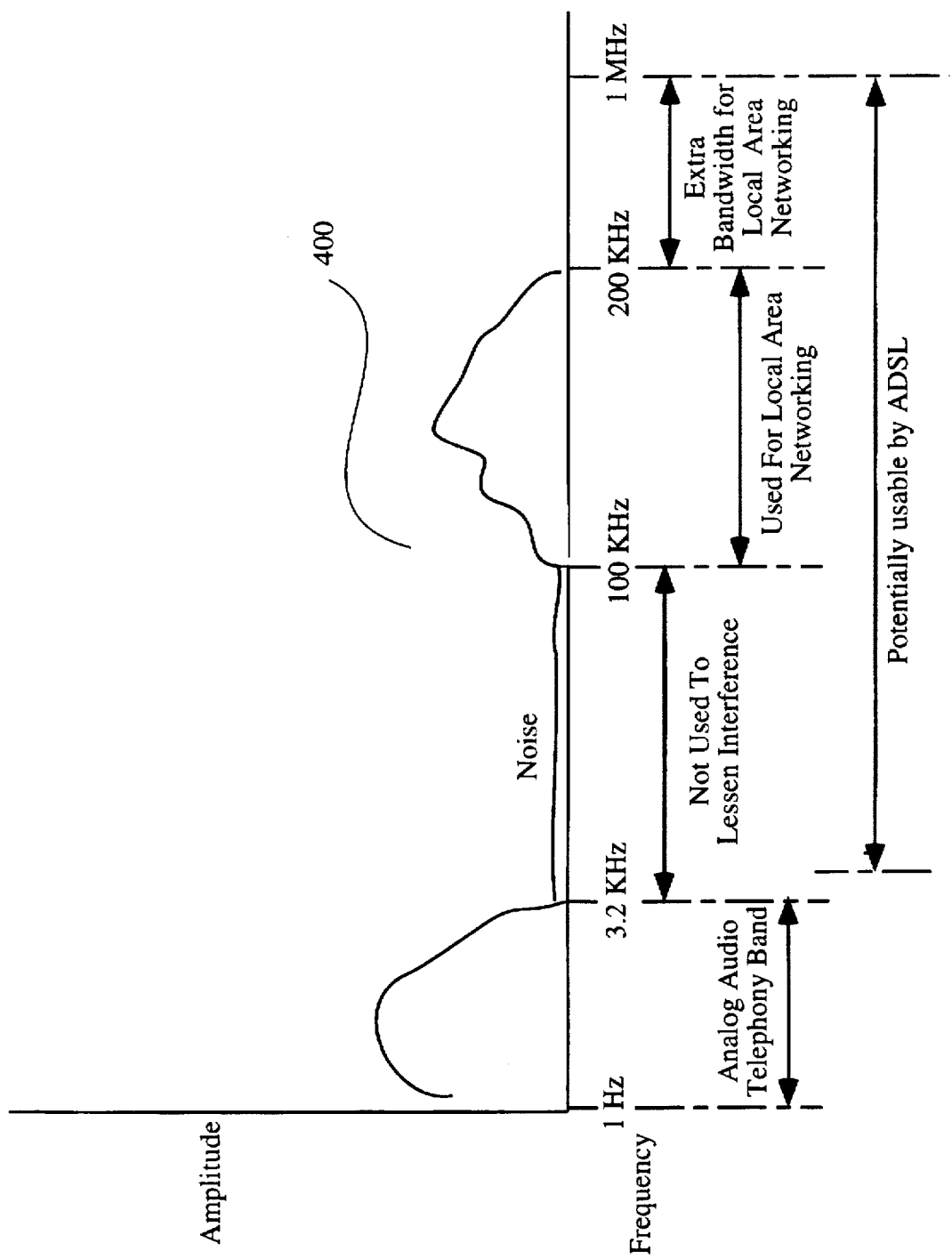
FIG. 4 is a spectrum diagram of the frequency bands on the telephone line simultaneously utilized according to one embodiment of the invention.

FIG. 4 is a spectrum diagram of the frequency bands on the telephone line simultaneously utilized according to one embodiment of the invention.

FIG. 4 shows an exemplary graph 400 of amplitude versus frequency for a signal space transmitted over the telephone line. From approximately 60 Hz to 3.2 KHz, ordinary POTS service takes place and the signal shown in the "analog telephony" band is placed on the line for transmission outside of the local loop. Within the local loop, high-frequency modems must filter out signals in this band as well as in the band from 3.2 KHz to 100 KHz where noise and unwanted harmonics may reside. Since analog telephony signals are not carried beyond approximately 3.2 KHz, the remainder of the frequency spectrum is available for local area networking.

However, several practical concerns constrain the spectral availability. The primary concern is that of attenuation due to resistive effects and slowing of signal transition due to capacitive effects of the twisted copper pair used as the telephone line. Severe signal degradation occurs only after 1 MHz, where a 1000 foot twisted pair of copper wire has been shown to exhibit 7.8 dB (decibels) of attenuation. Also, to lessen overlap (crosstalk) and interference, the band between 3.2 KHz and 100 KHz is unused by local area networking.

In one embodiment, as shown in graph 400, only the band between 100 KHz and 200 KHz is used to send local area networking signals using the high-frequency modems. A high-frequency bandpass filter would pass only this band and filter out the rest of the spectrum. With a 100 KHz band, a data rate of $4 \times 10^3$ bits per second is possible using binary FSK. The band from 200 KHz to 1 MHz is not used in this embodiment, but may be used as extra bandwidth in different embodiments to improve error detection or increase the data rate.

The graph 400 of FIG. 4 also shows that a band between 40 KHz and 1 MHz may be potentially used by ADSL running on the same twisted pair without interference. Networking protocols that facilitate retires and retransmission of data to avoid collisions can be utilized to ensure that interference is minimized.

FIG. 5 illustrates the components of one embodiment of the invention. A telephone company ("telco") supplies a two wire local phone loop, one wire labeled ring 560 and the other tip 550. A junction box 510 is used as a testing and measurement junction separating the local loop from the telco line. Junction box 510 includes an audio frequency bandpass filter 512 to prevent radiating out of high frequency signals from H-F (high-frequency) modems 520 and 530. H-F modem 520 and H-F modem 530 are connected to the two wire loop at tip and ring which appear as one connection.

If an older-style telephone 500 is connected on the local loop, two audio frequency bandpass filters, 505 and 506 are connected to the tip and ring lines respectively to prevent high-frequency signals from experiencing undue attenuation. The attenuation in older-style telephones is due to these telephones having high resistive and impedance characteristics. Each of the audio frequency bandpass filters 512, 505 and 506 pass the audio frequency band from 60 Hz to 3.2 KHz and filter out high frequencies as is required for POTS telephony. The addition of these filters expands the flexibility of the frequency isolation system and along with counterpart high frequency bandpass filters within modems 520 and 530, can alleviate most of the problems associated with multiplexing high and low frequencies. Though only two modems 520 and 530 are shown in this embodiment, many more H-F modems may be added so that more machines may join in the peer-to-peer local area network. The design of audio frequency bandpass filters is well known in the art and will not be discussed except in that the filters should be designed so as to account for impedance effects of the H-F modems as well as telephone devices.

What is claimed is:

1. A system for local area networking among a plurality of devices on a local loop of an analog telephone line simultaneously with analog telephony, said system comprising:

a plurality of high-frequency modems coupled to said telephone line, each modem coupled to one of said devices, each modem adapted to receive and transmit signals of frequencies higher than an analog telephony range, each modem adapted to full duplex by a use of one of a bandsplitting and an echo cancellation;

a high-frequency bandpass filter coupled to each modem for eliminating signals of frequencies within the analog telephony range from being received by said modem; and an audio frequency bandpass filter coupled to said telephone line at a junction, said junction defining the boundary of said local loop, said filter adapted to prevent said higher-frequency signals from radiating outside said local loop.

2. A system for local area networking according to claim 1 further comprising a second audio frequency bandpass filter coupled to selected telephones coupled to said local loop that unduly attenuate said higher-frequency signals.

3. A system for local area networking according to claim 1 wherein said higher-frequency signals range from approximately 100 Kilohertz to 200 Kilohertz.

4. A system for communicating over a network according to claim 1 wherein said higher-frequency signals represent data and control information of said devices.

5. A system for local area networking according to claim 1 wherein said high-frequency modems utilize frequency shift keying.

6. A system for local area networking according to claim 1 wherein said low-frequency signals are utilized to dial out to a public switched telephone network for the purpose of analog telephony.

7. A system for local area networking according to claim 6 wherein said analog telephony includes the use of low-frequency modems that can dial out to a public switched telephone network.

8. A system for local area networking according to claim 1 wherein said devices include computers.

9. A method for simultaneous local area networking and analog telephony on a local loop comprising the steps of:

setting up the local loop for high-frequency local area networking;

setting up devices to be local area networked with high-frequency modems;

initiating said modems to send and receive data signals at high frequency, said modems configure to operate at full duplex by using one of a bandsplitting and an echo cancellation; and communicating among said devices, said modems broadcasting high-frequency data signals on the local loop simultaneously with audio-range low frequency signals for analog telephony outside said local loop.

10. A method for simultaneous local area networking and analog telephony on a local loop according to claim 9 wherein the step of communicating includes the steps of:

broadcasting high-frequency signals from a first of said modems to one or more other of said modems designated as destination modems;

preventing collision between said broadcasted high-frequency signals and other high-frequency signals on said local loop; and receiving said high-frequency signal at said destination modems.

11. A method for simultaneous local area networking and analog telephony on a local loop according to claim 9 further comprising the step of:

applying filtering to remove unwanted and audio frequency signals from being received by said destination modems.

12. A method for simultaneous local area networking and analog telephony on a local loop according to claim 9 wherein the step of preventing collision includes the steps of:

detecting collisions between said broadcasted signals and other high-frequency signals on said local loop; and retrying said broadcasted signal after waiting a specified timeout.

* * * * *